Oct. 30, 1934.   F. A. HOLFORD ET AL   1,978,673
TIRE CHANGER STAND
Filed Jan. 2, 1934
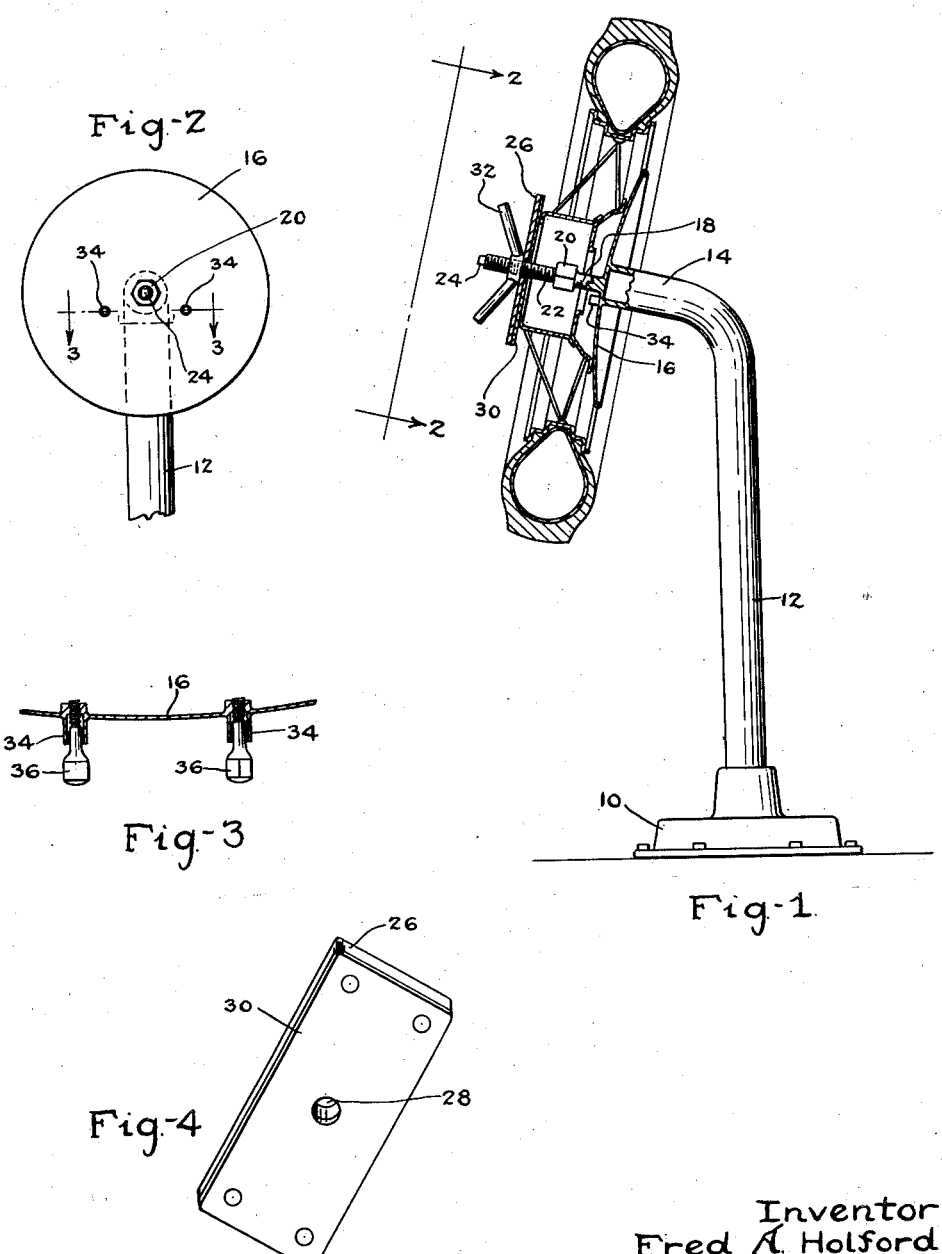
Inventors:
Fred A. Holford.
Alfred H. Jenson.
By Whiteley and Ruckman
Attorneys.

Patented Oct. 30, 1934

1,978,673

UNITED STATES PATENT OFFICE 1,978,673

TIRE CHANGER STAND

Fred A. Holford and Alfred H. Jenson,
Lamberton, Minn.

Application January 2, 1934, Serial No. 704,928

4 Claims. (Cl. 144—288)

Our invention relates to tire changer stands. An object of the invention is to provide a stand upon which a motor vehicle wheel may be placed and rigidly held while removing the tire therefrom instead of the usual practice of placing the wheel on the floor. The securing of the wheel to the stand makes it much more convenient to remove and replace the tire and at the same time, liability of marring the paint or finish of the wheel is very much diminished. Another object of the invention is to provide a device of this character which is of durable, inexpensive and simple construction and of especial utility in automobile repair shops.

The full objects and advantages of our invention will appear in connection with the detailed description thereof and the novel features embodied in our inventive idea will be particularly pointed out in the claims.

In the accompanying drawing which illustrates a practical embodiment of our invention,—

Fig. 1 is a side elevational view of the device with certain parts in section and showing a wheel in place for removal of the tire. Fig. 2 is a fragmentary view of the device looking from the line 2—2 of Fig. 1. Fig. 3 is a view in section on the line 3—3 of Fig. 2. Fig. 4 is a perspective view of a clamping plate.

Referring to the construction shown in the drawing, the numeral 10 designates a base which is bolted to the floor A standard 12 extends up from the base, the standard being preferably of tubular or rod-like construction. The upper portion of the standard is bent or deflected at somewhat less than a right angle so as to produce a member 14 which inclines upwardly. A plate or disk 16 is secured to the outer end of the member 14 in suitable manner as by welding. The disk 16 is convexed backwardly as shown so that there will be plenty of room to work on the tire. A stem 18 extends out perpendicularly from the center of the disk 16 so that this stem has the same angle of inclination as the member 14 of the standard. A nut 20 is secured to the end of the stem 18. A threaded rod or bolt 22 is adapted for engagement with the internal threads of the nut 20 so as to extend out in alinement with the stem 18. The outer end of the rod 22 is squared as indicated at 24 so that the rod may be readily applied to and removed from the nut 20. A plate 26 is provided with a central hole 28 large enough so that the plate may readily slide on the rod 22. The face or engaging surface of the plate 26 is provided with a pad 30 so as to prevent marring the paint or finish of the wheel when the plate is placed against the wheel as shown in Fig. 1. A wing nut 32 is adapted to turn on the threaded rod 22 for tightening up the plate 26 against the wheel and holding the latter securely in place. In order to provide for certain wheels from which the hub cap cannot be removed, sockets 34 are formed on the disk 16. The rear portions of these sockets are threaded to receive the threads of bolts 36. The opening in the forward portion of the sockets 34 is somewhat enlarged as shown in Fig. 3 in order that it may be easy to insert the bolts 36.

The operation and advantages of our device will be readily understood in connection with the foregoing description and accompanying drawing. For makes of wheels now in general use either of the wood, wire or disk type, the hub cap is removed and the wheel may then be readily secured to the stand in the manner previously described. For a few wheels still in use from which the hub cap cannot be removed, the threaded rod 22 is taken off and the bolts 36 are used to secure such wheels in the manner previously referred to.

We claim:

1. A tire changer stand comprising a base adapted to be bolted to the floor, a rod-like standard extending up vertically from said base, a member integral with said standard deflected to extend out at an upward inclination, a plate secured to the outer end of said upwardly inclined member at right angles thereto, and means for clamping a wheel in canted position against said plate.

2. A tire changer stand comprising a base adapted to be bolted to the floor, a rod-like standard extending up vertically from said base, a member integral with said standard deflected to extend out at an upward inclination, a rearwardly convexed plate secured to the outer end of said upwardly inclined member at right angles thereto, and means for clamping a wheel in canted position against said plate.

3. A tire changer stand comprising a base adapted to be bolted to the floor, a rod-like standard extending up vertically from said base, a member integral with said standard deflected to extend out at an upward inclination, a plate secured to the outer end of said upwardly inclined member at right angles thereto, a stem extending out perpendicularly from the center of said plate, a nut secured to the end of said stem, a threaded rod having engagement with the threads of said nut, and a wing nut engageable with the threads of said rod for clamping a wheel in canted position against said plate.

4. A tire changer stand comprising a base adapted to be bolted to the floor, a rod-like standard extending up vertically from said base, a member integral with said standard deflected to extend out at an upward inclination, a plate secured to the outer end of said upwardly inclined member at right angles thereto, screw threaded sockets formed in said plate, and clamping bolts cooperating with said sockets for clamping a wheel in canted position against said plate.

FRED A. HOLFORD.
ALFRED H. JENSON.